US008405778B2

(12) United States Patent  
Yoshino et al.

(10) Patent No.: US 8,405,778 B2  
(45) Date of Patent: Mar. 26, 2013

(54) INFORMATION DISPLAY DEVICE, INFORMATION DISPLAY METHOD, INFORMATION DISPLAY PROGRAM, AND RECORDING MEDIUM

(75) Inventors: Miyuki Yoshino, Ogawa (JP); Hidetsugu Kubota, Fujimi (JP); Taro Aiura, Sayama (JP); Kazuyoshi Takahashi, Asaka (JP)

(73) Assignee: Pioneer Corporation, Kanagawa (JP)

( * ) Notice: Subject to any disclaimer, the term of this patent is extended or adjusted under 35 U.S.C. 154(b) by 0 days.

(21) Appl. No.: 13/120,925

(22) PCT Filed: Sep. 30, 2008

(86) PCT No.: PCT/JP2008/067761  
§ 371 (c)(1),  
(2), (4) Date: Apr. 7, 2011

(87) PCT Pub. No.: WO2010/038277  
PCT Pub. Date: Apr. 8, 2010

(65) Prior Publication Data  
US 2011/0181732 A1 Jul. 28, 2011

(51) Int. Cl.  
*H04N 5/50* (2006.01)

(52) U.S. Cl. .......................................... 348/570; 348/731

(58) Field of Classification Search .................. 348/558, 348/570, 553–555, 180, 725, 731–733, 569; *H04N 5/46, 17/00, 3/27, 5/44, 5/50*  
See application file for complete search history.

(56) References Cited

U.S. PATENT DOCUMENTS

| 7,580,612 | B2 | 8/2009 | Sato et al. |
| 2005/0153650 | A1 | 7/2005 | Hikomoto |
| 2006/0083315 | A1 | 4/2006 | Sato et al. |
| 2006/0164563 | A1* | 7/2006 | Watanabe et al. ............. 348/731 |

FOREIGN PATENT DOCUMENTS

| JP | 2000-261731 | 9/2000 |
| JP | 2005-252673 | 9/2005 |
| JP | 2005-351955 | 12/2005 |
| JP | 2005-354349 | 12/2005 |
| JP | 2006-115264 | 4/2006 |
| JP | 2006-313973 | 11/2006 |
| JP | 2008-085464 | 4/2008 |
| WO | 2004/080011 | 9/2004 |

OTHER PUBLICATIONS

International Search Report—PCT/JP2008/067761—Apr. 7, 2009.  
JP Office Action dated Dec. 11, 2012, with partial English Translation; Application No. 2010-531671.

* cited by examiner

*Primary Examiner* — Sherrie Hsia  
(74) *Attorney, Agent, or Firm* — Young & Thompson

(57) ABSTRACT

An information display apparatus having a display unit that displays first information based on a signal corresponding to one channel in a broadcast wave received by a receiving unit, further includes a detecting unit that detects a reception state of the signal while the first information is displayed on the display unit; a judging unit that judges whether information displayed on the display unit has been changed from the first information to second information, if the reception state of the signal has deteriorated; a monitoring unit that monitors whether the reception state has returned to a favorable state, if the displayed information has been judged to have been changed to the second information; and a display control unit that continues display of the second information and redisplays the first information on a portion of the display unit, if the reception state of the signal has returned to a favorable state.

9 Claims, 6 Drawing Sheets

INFORMATION DISPLAY DEVICE, INFORMATION DISPLAY METHOD, INFORMATION DISPLAY PROGRAM, AND RECORDING MEDIUM

TECHNICAL FIELD

The present invention relates to an information display apparatus, an information display method, an information display program, and a recording medium that receive a broadcast wave under circumstances in which the reception state of the broadcast wave, such as at a mobile object, has the potential of deteriorating.

BACKGROUND ART

Conventionally, for example, information display apparatuses have been proposed that under circumstances in which broadcast signal reception, such as by a mobile object, has the potential of deteriorating, use an antenna to receive broadcast waves for TV broadcasts (television broadcasts) and radio broadcasts, and from the received broadcast waves, use a tuner to output to a speaker and a display, a signal corresponding to a selected channel.

Further, information display apparatuses have been proposed that have multiple information sources such as for DVD (Digital Versatile Disk) output and navigation functions, in addition to the output of TV broadcasts and radio broadcasts. Such information display apparatuses automatically switch to a different information source when, for example, a weak electric field area is entered while a TV broadcast or a radio broadcast is being output and the reception level of a signal corresponding to a desired channel included in the broadcast wave drops causing the reception state to become inadequate. Subsequently, if the reception state of the signal has recovered to an adequate state, the output of the original information source (the TV broadcast or the radio broadcast) is automatically resumed (see, for example, Patent Document 1 below).

Further, an information display apparatus has been proposed that includes a reception state monitoring unit that detects the broadcast wave reception state and displays on a display, the broadcast wave reception state detected by the reception state monitoring unit (see, for example, Patent Document 2 below). With this information display apparatus, if the broadcast wave reception state detected by the reception state monitoring unit is not favorable, the output of the broadcast signal corresponding to the desired channel included in the broadcast wave is terminated and the reception state of the broadcast wave continues to be detected and displayed on the display.

[Patent Document 1] Japanese Patent Application Laid-Open Publication No. 2000-261731

[Patent Document 2] Japanese Patent Application Laid-Open Publication No. 2006-313973

DISCLOSURE OF INVENTION

Problem to be Solved by the Invention

Nonetheless, with the technology of Patent Document 1, a problem arises in that, for example, even if the user wishes to continue viewing the information source that has been switched to, the original information source is automatically resumed. Therefore, a problem arises in that after the original information source has been resumed, the user has the burden of having to again change the original information source to the information source that was switched to.

Further, with the technology of Patent Document 2, a problem arises in that, for example, if the broadcast wave includes signals corresponding to multiple channels, the user is does not know whether the reception state of the signal corresponding to the desired channel has recovered to a viewable state. Moreover, since only information of whether the reception state is favorable is reported, a problem of inconvenience arises in that, for example, when the reception state has recovered, without actually changing the channel to a desired channel, the user does not know what type of broadcast is being aired on the desired channel.

Means for Solving Problem

To solve the problems above and achieve an object, an information display apparatus according to one embodiment has a display unit that displays information (hereinafter, "first information") that is based on a signal corresponding to one channel in a broadcast wave received by a receiving unit. The information display apparatus further includes a detecting unit that detects a reception state of the signal corresponding to the first information while the first information is displayed on the display unit; a judging unit that judges whether information displayed on the display unit has been changed from the first information to other information (hereinafter, "second information"), if the reception state of the signal corresponding to the first information has deteriorated; a monitoring unit that monitors whether the reception state of the signal corresponding to the first information has returned to a favorable state, if the information displayed on the display unit has been judged to have been changed to the second information; and a display control unit that continues display of the second information and redisplays the first information on a portion of the display unit, if the reception state of the signal of the first information has returned to a favorable state.

Further, an information display method according to another embodiment is of an information display apparatus having a display unit that displays information (hereinafter, "first information") that is based on a signal corresponding to one channel in a broadcast wave received by a receiving unit. The information display method includes a detecting step of detecting a reception state of the signal corresponding to the first information while the first information is displayed on the display unit; a judging step of judging whether information displayed on the display unit has been changed from the first information to other information (hereinafter, "second information"), if the reception state of the signal corresponding to the first information has deteriorated; a monitoring step of monitoring whether the reception state of the signal corresponding to the first information has returned to a favorable state, if the information displayed on the display unit has been judged to have been changed to the second information; and a display control step of continuing display of the second information and redisplaying the first information on a portion of the display unit, if the reception state of the signal of the first information has returned to a favorable state.

An information display program can cause a computer to execute the information display method disclosed.

A computer-readable recording medium can store therein the information display program disclosed.

Figure 1:
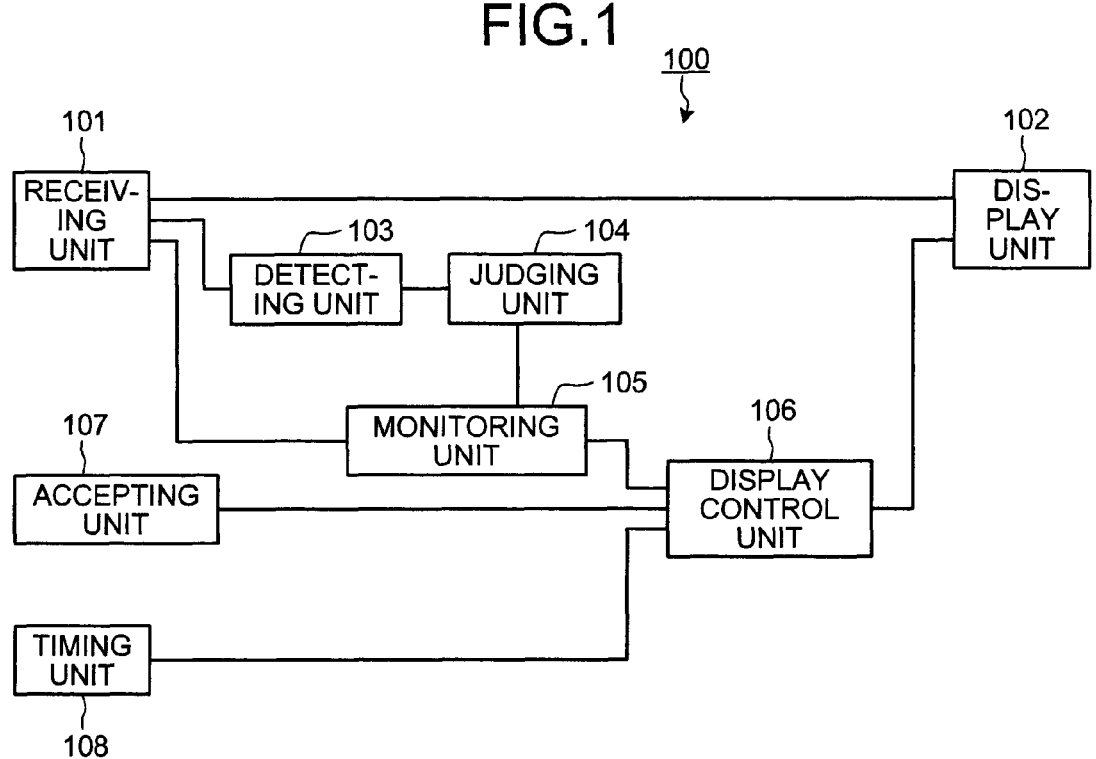
FIG. 1 is a block diagram of a functional configuration of an information display apparatus according to an embodiment.

EXPLANATIONS OF LETTERS OR NUMERALS 100 information display apparatus
101 receiving unit
102 display unit
103 detecting unit
104 judging unit
105 monitoring unit
106 display control unit
107 accepting unit
108 timing unit

BEST MODE(S) FOR CARRYING OUT THE INVENTION

With reference to the accompanying drawings, a preferred embodiment of an information display apparatus, an information display method, an information display program, and a recording medium according to the invention will be described.

Embodiment (Functional Configuration of Information Display Apparatus)

A functional configuration of an information display apparatus 100 according to the embodiment of the invention will be described. FIG. 1 is a block diagram of a functional configuration of the information display apparatus according to the embodiment.

As depicted in FIG. 1, the information display apparatus 100 includes a receiving unit 101, a display unit 102, a detecting unit 103, a judging unit 104, a monitoring unit 105, a display control unit 106, accepting unit 107, and a timing unit 108. The receiving unit 101 receives a broadcast wave. The broadcast wave is, for example, an information source broadcast wave such as a digital television broadcast, an analog television broadcast, a radio broadcast and an internet broadcast, and may include signals (e.g., video signal, audio signal, etc.) corresponding to multiple channels.

The display unit 102 includes a display screen that displays video according to a video signal. Specifically, display unit 102 displays information (hereinafter, "first information") that is based on a signal corresponding to 1 channel in the broadcast wave received by the receiving unit 101. Further, if the information display apparatus 100 has a navigation function, map data may be displayed on the display screen. In this case, the map data is stored in a (non-depicted) storage device. Map data includes road network data constituted by nodes and links, and image data drawn using features related to facilities and geographical features (mountains, rivers, land, etc.) in addition to roads. The map data may include text information, information such as facility names and addresses as well as images of roads and facilities, etc.

The detecting unit 103 detects the reception state of the signal corresponding to the first information received by the receiving unit 101, while the first information is displayed on the display unit 102. The reception state of the signal for the first information, specifically, for example, is the state of the electric field strength of the signal for the first information or the error rate thereof.

The judging unit 104 judges whether the information displayed on the display unit 102 has been changed from the first information to other information (hereinafter, "second information"), if the reception state of the signal corresponding to the first information and detected by the detecting unit 103 has deteriorated. The second information may be a signal corresponding to another channel of the information source of the first information or an information source different from that of the first information. An information source different from that of the first information may be, for example, an information source that is not a received broadcast wave for navigation, such as a DVD (Digital Versatile Disc) and HD (hard disk). Further, if the first information is a full-seg (12-segment broadcast) digital television broadcast, the second information may be a 1-seg broadcast (1-segment broadcast), which has a wider reception range than full-seg. In this case, the first information and the second information may be information based on a signal that corresponds to the same channel.

The judging unit 104, specifically, for example, judges whether the information displayed on the display unit 102 has been changed from the first information to the second information, if the electric field strength of the signal corresponding to the first information is less than or equal to a given value. Further, the judging unit 104 may judge whether the information displayed on the display unit 102 has been changed from the first information to the second information, if the error rate of the signal corresponding to the first information is equal to or greater than a given value. The information displayed on the display unit 102 may be changed from the first information to the second information by a user operation or may be automatic.

The monitoring unit 105 monitors whether the reception state of the signal corresponding to the first information has returned to a favorable state, if the judging unit 104 judges that the information displayed on the display unit 102 has been changed from the first information to the second information. Here, a favorable state, specifically, for example, is a state where the electric field strength is greater than a given value or a state where the error rate is less than a given value. Identifying information that identifies the first information being displayed on the display unit 102 when the reception state has deteriorated may be preliminarily stored to a non-depicted storage device. In this case, based on the identifying information stored in the storage device, the monitoring unit 105 may determine the first information monitoring the reception state, if the judging unit 104 judges that the information displayed on the display unit 102 has been changed from the first information to the second information.

The display control unit 106 continues the display of the second information and redisplays the first information on a portion of the display unit 102, if the reception state of the signal of the first information has returned to a favorable state. The display control unit 106, for example, on a portion of the display unit 102, redisplays the first information in a size equivalent to that of the second information, or in a size smaller than that of the second information.

The display control unit 106, specifically, may display the first information on a portion of the display area of the second information, or may display the display area of the second information and the display area of the first information as if superimposed on one another. Further, the display position of the first information is preferably a position that does not interfere with the second information. Specifically, if the first information is displayed in a size smaller than that of the second information, the first information is displayed, for example, at the top, the bottom, the center, the left, or the right of the display screen. Further, if the first information is displayed to be the same size as the second information, the first information and the second information are displayed at the top and the bottom, the left and the right, or at corners of the display screen. The display position of the first information and the second information may be settable by the user.

The display control unit 106 may redisplay on the display unit 102, the first information in a size that changes stepwise. The display control unit 106, specifically, may gradually enlarge the display area of the first information and if no user operation is received, may display on the display unit 102, the first information only. Further, the display control unit 106, specifically, may gradually decrease the display area of the first information and if no user operation is received, may display on the display unit 102, the second information only. In this case, the size of the display area of the first information may be returned to the original size any number of times, whereby the redisplay of the first information can be prevented from being overlooked by the user.

Further, the display control unit 106 may slide the display area of the first information from an edge of the display screen and gradually enlarge the display area. In this case, the display area of the second information is reduced accompanying the enlargement of the display area of the first information and if no user operation is received, the first information alone may be displayed on the display unit 102. Further, the display of the first information may be blended (mixed) with the display of the second information. In this case, if no user operation is received, the first information alone may be displayed on the display unit 102.

The accepting unit 107, when the first information and the second information are being displayed on the display unit 102, accepts from the user, an instruction selecting either information to be displayed alone on the display unit 102. In this case, the display control unit 106, based on the selection instruction accepted by the accepting unit 107, displays only one among the first information and the second information on the display unit 102. The accepting unit 107, specifically, judges whether a key(s) displayed on the display unit 102 has been manipulated by the user and if a key(s) has been manipulated, the accepting unit 107 accepts the instruction based on the manipulated key(s).

The timing unit 108 times whether a given period has elapsed since the resumed display of the first information on a portion of the display unit 102 by the display control unit 106. In this case, when the given period has elapsed according to the timing by the timing unit 108, the display control unit 106, based on an instruction preliminarily set, displays only one among the first information and the second information on the display unit 102.

(Information Display Processing by Information Display Apparatus)

Figure 2:
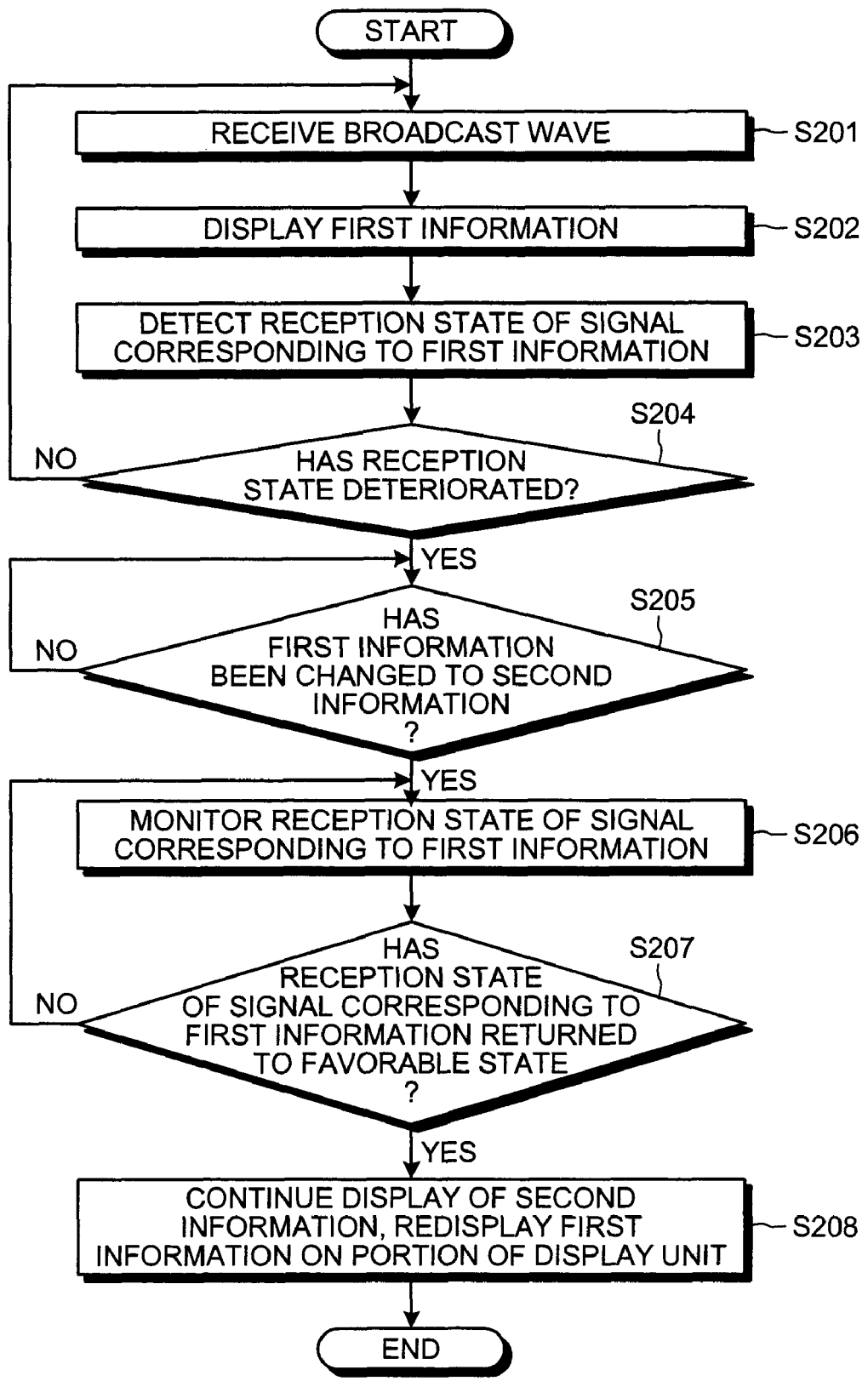
FIG. 2 is a flowchart of an information display procedure of the information display apparatus.

Information display processing by the information display apparatus 100 will be described. FIG. 2 is a flowchart of an information display procedure of the information display apparatus. As depicted in the flowchart of FIG. 2, the information display apparatus 100 receives a broadcast wave via the receiving unit 101 (step S201) and displays on the display unit 102, the first information that is based on a signal corresponding to 1 channel of the broadcast wave received at step S201 (step S202).

The information display apparatus 100 detects, via the detecting unit 103, the reception state of the signal corresponding to the first information displayed on the display unit 102 at step S202 (step S203) and judges whether the reception state of the signal corresponding to the first information has deteriorated (step S204). If the reception state has deteriorated (step S204: YES), the information display apparatus 100 waits until the judging unit 104 judges that the information displayed on the display unit 102 has been changed from the first information to the second information (step S205: NO). Here, the second information is, for example, information that is based on a signal that corresponds to a channel that is different from that of the first information and also included in the broadcast wave received at step S201 or is information that is based on a signal that is not a received signal such as a DVD broadcast wave.

At step S204, specifically, for example, the information display apparatus 100 judges whether the electric field strength of the signal corresponding to the first information is $\leqq$ a given value and if the electric field strength is the given value or less, judges that the reception state has deteriorated. Further, for example, the information display apparatus 100 may judge whether the error rate of the signal corresponding to the first information is $\geqq$ a given value and if the error rate is the given value or more, may judge that the reception state has deteriorated.

At step S205, if the information displayed on the display unit 102 has been judged to have change from the first information to the second information (step S205: YES), the information display apparatus 100, via the monitoring unit 105, monitors the reception state of the signal corresponding to the first information (step S206). If the reception state of the signal corresponding to the first information has returned to a favorable state (step S207: YES), the information display apparatus 100, via the display control unit 106, continues the display of the second information and redisplays the first information on a portion of the display unit 102 (step S208), ending the processing.

On the other hand, at step S204, if the reception state of the signal corresponding to the first information is favorable (step S204: NO), the information display apparatus 100 returns to step S201 and repeats the processing therefrom. Further, at step S207, if the reception state of the signal corresponding to the first information has not returned to a favorable state (step S207: NO), the information display apparatus 100 returns to step S206 and repeats the processing therefrom.

In the flowchart depicted in FIG. 2, after step S208, when the first information and the second information are both displayed on the display unit 102, the information display apparatus 100, via the accepting unit 107, may accept from the user, an instruction selecting either information to be displayed alone on the display unit 102. In this case, the display control unit 106, based on the selection instruction accepted by the accepting unit 107, displays only one among the first information and the second information on the display unit 102.

Further, in the flowchart of FIG. 2, after step S208, the information display apparatus 100, via the timing unit 108, may time whether a given period has elapsed since the resumed display of the first information on a portion of the display unit 102. In this case, when the given period has elapsed according to the timing by the timing unit 108, the display control unit 106, based on an instruction preliminarily set, displays only one among the first information and the second information on the display unit 102.

Additionally, in the flowchart of FIG. 2, at step S208, the information display apparatus 100 may redisplay the first information in a size equivalent to or smaller that of the second information, or may display the first information in a size that changes stepwise, on the display unit 102.

As described, according to the information display apparatus 100 of the embodiment, if the judging unit 104 judges that the information displayed on the display unit 102 has been changed from the first information to the second information, the monitoring unit 105 can monitor whether the reception state of the signal corresponding to the first information has returned to a favorable state. If the reception state of the signal of the first information has returned to a favorable state, the display control unit 106 can continue the display of the second information and redisplay the first information on a portion of the display unit 102. Therefore, if the reception state of the first information deteriorates and then returns to a favorable state after the information displayed on the display unit 102 has been changed to the second information, both the second information and the first information can be displayed on the display unit 102, whereby the user can be notified that the reception state of the first information, which was being viewed originally, has become favorable, while the display of the second information, which is currently being displayed, continues. Furthermore, the user is able to check the contents of the first information after the reception has returned to a favorable state.

According to the information display apparatus 100 of the embodiment, if the accepting unit 107 accepts from the user, an instruction selecting either information to be displayed alone on the display unit 102 when the first information and the second information are being displayed on the display unit 102, based on this selection instruction, the display control unit 106 is able to display only one among the first information and the second information on the display unit 102. Consequently, while the second information is being displayed, if the reception state of the first information, which was originally being viewed by the user, returns to a favorable state, the information to be displayed on the display unit 102 can be controlled by the acceptance of an instruction from the user. Thus, while checking the content of the first information, which was originally being viewed, the user can select whether to continue the display of the second information or return to the display of the first information.

According to the information display apparatus 100 of the embodiment, if a given period of time has elapsed according to the timing by the timing unit 108, the display control unit 106, based on a preliminarily set instruction, is able to display only one among the first information and the second information on the display unit 102. Therefore, if both the first information and the second information are being displayed and, for example, an instruction is not accepted from the user within the given period, either the first information or the second information alone can be displayed automatically. Consequently, the user can cause desired information to be displayed based on a preliminarily set instruction. The operation of selecting information need only be performed if the user wants to display information different from that of the preliminarily set instruction, saving troublesome operation.

According to the information display apparatus 100 of the embodiment, the display control unit 106 can resume display of the first information in a size equivalent to or smaller than that of the second information on the display unit 102. Consequently, when the display of the first information is resumed, the display of the second information, which is currently being displayed, can be prevented from becoming difficult to see. Thus, the user is able to confirm the contents of both the first information and the second information.

According to the information display apparatus 100 of the embodiment, the display control unit 106 is able to redisplay the first information in a size that changes stepwise, whereby the user is able to easily differentiate the second information currently being displayed and the redisplayed first information.

According to the information display apparatus 100 of the embodiment, if the judging unit 104 judges that the electric field strength of signal corresponding to the first information is equal to or less than a given value, or that the error rate of the signal corresponding to the first information is equal to or greater than a given value, the judging unit 104 judges whether the information displayed on the display unit 102 has been changed from the first information to the second information. Consequently, when a desired channel in a digital broadcast is being viewed, the user is able to judge that the reception of the channel has deteriorated.

Example

Hereinafter, an example of the invention will be described. In the present example, description is given with the information display apparatus according to the embodiment of the present invention being implemented by, for example, a mobile-object broadcast receiving apparatus equipped on a vehicle (including 4-wheel vehicles and 2-wheel vehicles) as one example. In the present example, although the broadcast wave received by the mobile-object broadcast receiving apparatus is explained in the case of a television broadcast wave, the broadcast wave is not limited hereto. Specifically, for example, the broadcast wave may be a radio broadcast wave or an internet broadcast wave. Further, the broadcast wave may include signals corresponding to plural channels, or may include a signal(s) corresponding to a single channel.

(Hardware Configuration of Mobile-Object Broadcast Receiving Apparatus)

Figure 3:
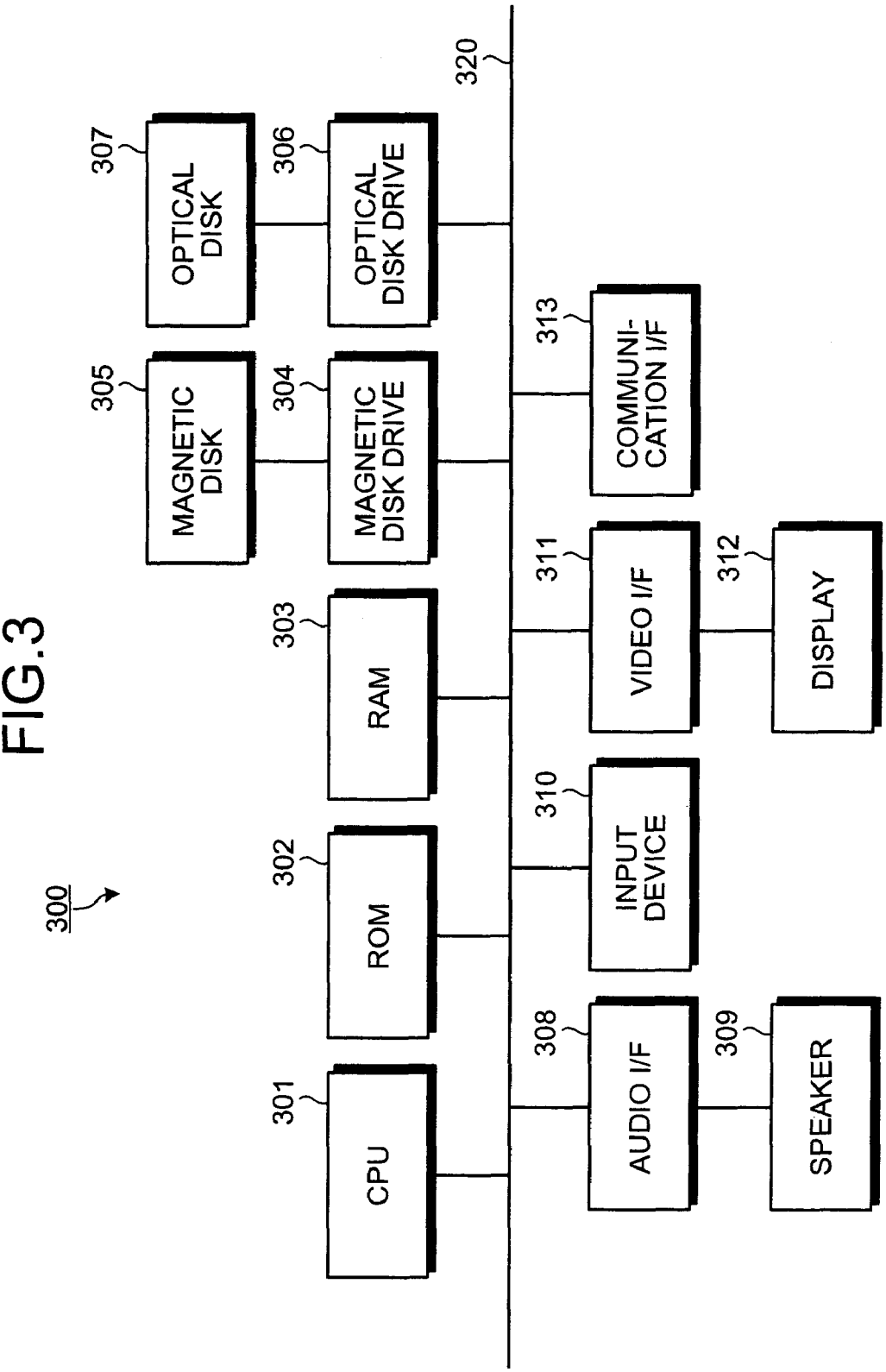
FIG. 3 is a block diagram of an example of a hardware configuration of a mobile-object broadcast receiving apparatus.

A hardware configuration of a mobile-object broadcast receiving apparatus 300 according to the example will be described. FIG. 3 is a block diagram of an example of a hardware configuration of the mobile-object broadcast receiving apparatus. As depicted in FIG. 3, the mobile-object broadcast receiving apparatus 300 includes a CPU 301, a ROM 302, a RAM 303, a magnetic disk drive 304, a magnetic disk 305, an optical disk drive 306, an optical disk 307, an audio I/F (interface) 308, a speaker 309, an input device 310, a video I/F 311, a display 312, and a communication I/F 313, respectively connected by a bus 320.

The CPU 301 governs overall control of the mobile-object broadcast receiving apparatus 300. The ROM 302 stores therein programs such a boot program, an information display program, a reception state detecting program, an information-change judging program, a reception state monitoring program, a display control program. The RAM 303 is used as a work area of the CPU 301. In other words, the CPU 301 uses the RAM 303 as a work area while executing various types of programs stored to ROM 302, thereby governing overall control of the mobile-object broadcast receiving apparatus 300.

The information display program, using the communication I/F 313 described hereinafter, displays through a decoder unit and on the display 312 described hereinafter, information (first information) that is based on a signal corresponding to one channel selected via a tuner unit and that is included in a television broadcast wave received by an antenna unit. The television broadcast wave is a radio wave that is transmitted by a broadcast station and includes signals that correspond to multiple channels.

The reception state detecting program, for example, detects the reception state of the first information displayed on the display 312 by the information display program. Specifically, for example, the electric field strength of a signal corresponding to one channel included in the television broadcast wave received by the communication I/F 313 or the state of the error rate thereof is detected.

The display-information-change judging program judges whether the information displayed on the display 312 described hereinafter has changed from the first information to the second information, if the reception state of a signal corresponding to one channel included in the television broadcast wave is detected by the reception state detecting program to have deteriorated. Concerning the judgment of whether the reception state has deteriorated, for example, the reception state is judged to have deteriorated if the electric field strength is equal to or less than a given value or the error rate is equal to or greater than a given value. The information that has been judged by the display-information-change judging program to have been changed to from the first information may be information that is based on a signal that corresponds to another channel included in the same television broadcast wave, or another information source such as a DVD and HD.

The reception state monitoring program monitors whether the reception state of the signal corresponding to the first information has recovered, if the information displayed on the display 312 is judged by the display-information-change judging program to have been changed. Specifically, for example, if the electric field strength of the signal corresponding to the first information is greater than a given value or if the error rate is less than a given value, the reception state is judged to have recovered.

The display control program continues the display of the second information and redisplays the first information on a portion of the display 312, if the reception state of the first information is judged by the reception state monitoring program to have recovered. The display position and display method will be described hereinafter.

If an instruction selecting the information to be displayed on the display 321 is accepted from a user when both the second information and the first information are displayed on the display 312, the display control program may display based on the accepted instruction, one among the first information and the second information on the display 312. Further, when both the second information and the first information are displayed on the display 312 and if an instruction from the user is not accepted and a given period has elapsed, the display control program displays one among the first information and the second information on the display 312, based on a preliminarily set instruction.

The magnetic disk drive 304, under the control of the CPU 301, controls the reading and the writing of data with respect to the magnetic disk 305. The magnetic disk 305 stores data written thereto under the control of the magnetic disk drive 304. An HD (hard disk) or an FD (flexible disk), for example, can be used as the magnetic disk 305.

The optical disk drive 306, under the control of the CPU 301, controls the reading and the writing of data with respect to the optical disk 307. The optical disk 307 is a removable recording medium from which data is read under the control of the optical disk drive 306. A writable recording medium can be used as the optical disk 307. In addition to the optical disk 307, an MO and the like may be used as a removable recording medium.

Video information and audio information as well as text information may be given as an example of the information stored to the recording medium, such as the magnetic disk 305 and the optical disk 307. Specifically, for example, signals corresponding to plural channels included in a received broadcast wave may be stored, as well as movie/concert video information and audio information.

If the mobile-object broadcast receiving apparatus 300 has a navigation function, the magnetic disk 305 and the optical disk 307 may store map information and functional data. Map information includes background data describing geographical features (features), such buildings, rivers and ground surfaces, and road shape data describing road shapes, respectively arranged in data files according to geographical area. Further, the current location of the vehicle is superimposed on the map information.

Road shape data further includes traffic condition data. Traffic condition data, for example, is information that for each node, indicates whether a traffic signal and/or pedestrian crossing is present, whether an expressway entrance/exit and/or or junction is present, etc.; and for each link, indicates the length of the link (distance), road width, direction of traffic flow, road type (expressway, toll road, one-way street, etc.), etc.

Functional data includes data such as 3-dimensional data indicating the shapes of facilities on a map, text data describing the facilities, and other types of non-map information. The map information and the functional data are stored in blocks according to geographical area or function. Specifically, for example, the map information is stored in blocks, according to geographical area, where each block enables a given geographical area to be displayed in a map displayed on the display screen. Further, for example, the functional data is stored in blocks, according to function, where each block enables implementation of 1 function.

In addition to 3-dimensional data and text data, the functional data includes data for implementing functions, such as program data for implementing route retrieval, calculation of required time, route guidance, etc. The map information and the functional data are respectively separated according to geographical area or function, into data files.

The mobile-object broadcast receiving apparatus 3 may include flash memory, although not depicted. Flash memory is re-writable and removable, nonvolatile, semiconductor memory to which data is read and written under the control of the CPU 301. For example, NAND-type flash memory and NOR-type flash memory may be used as the flash memory. One example of information stored to the flash memory includes the video information/audio information and the text information, or the map information, the functional data above, etc. Furthermore, the flash memory may have the function of the ROM 302, i.e., the flash memory may store the programs above.

The audio I/F 308 is connected to the speaker 309, which is for audio output. Sound derived from a signal that has been D/A converted at the audio I/F 308 is output from the speaker 309.

The input device 310 may be a remote controller, keyboard, touch panel, and the like, having keys for the input of text, numeric values, various types of instructions, etc. The input device 310 may be implemented by any one among a remote controller, a keyboard and a touch panel, or may be implemented any combination thereof.

The video I/F 311 is connected to the display 312. The video I/F 311, specifically, for example, is configured by a graphic controller that governs overall control of the display 312, buffer memory such as VRAM (Video RAM) that temporarily stores immediately displayable image information, and a control IC that controls the display 312.

The display 312 displays icons, a cursor, menus, windows, or various data such as text and images. A CRT, a TFT liquid crystal display, a plasma display, etc. may be employed as the display 312, for example.

The communication I/F 313 is wirelessly connected to a network and functions as an interface between the mobile-object broadcast receiving apparatus 300 and the CPU 301. The communication I/F 313 is further connected to a communications network, such as the internet and functions as an interface between the network and the CPU 301.

The communications network includes LANs, WANs, and public switched telephone networks as well as mobile telephone networks. Specifically, the communication I/F 313, for example, is configured by an FM tuner, etc.

The communication I/F 313 includes, for example, the antenna unit that receives a television broadcast wave from a broadcast station; the tuner unit that receives from the antenna, the television broadcast wave of a selected program (channel) unit and converts the broadcast wave into a digital signal; and the decoder unit that separates the digital signal from the tuner unit, into video information and audio information.

Functions of the receiving unit 101, the display unit 102, the detecting unit 103, the judging unit 104, the monitoring unit 105, the display control unit 106, the accepting unit 107, and the timing unit 108 of the information display apparatus 100 depicted in FIG. 1 are implemented by using the programs and data stored on the ROM 302, the RAM 303, the magnetic disk 305, the optical disk 307 of the mobile-object broadcast receiving apparatus 300 depicted in FIG. 3 to execute a given program on the CPU 301 and control the units of the mobile-object broadcast receiving apparatus 300.

In other words, mobile-object broadcast receiving apparatus 300 according to the example can execute a function of the information display apparatus 100 depicted in FIG. 1, by the information display processing depicted in FIG. 2 by executing the information display program stored on the ROM 302 used as a recording medium in the mobile-object broadcast receiving apparatus 300.

(Mobile-Object Broadcast Receiving Apparatus Processing)

Figure 4:
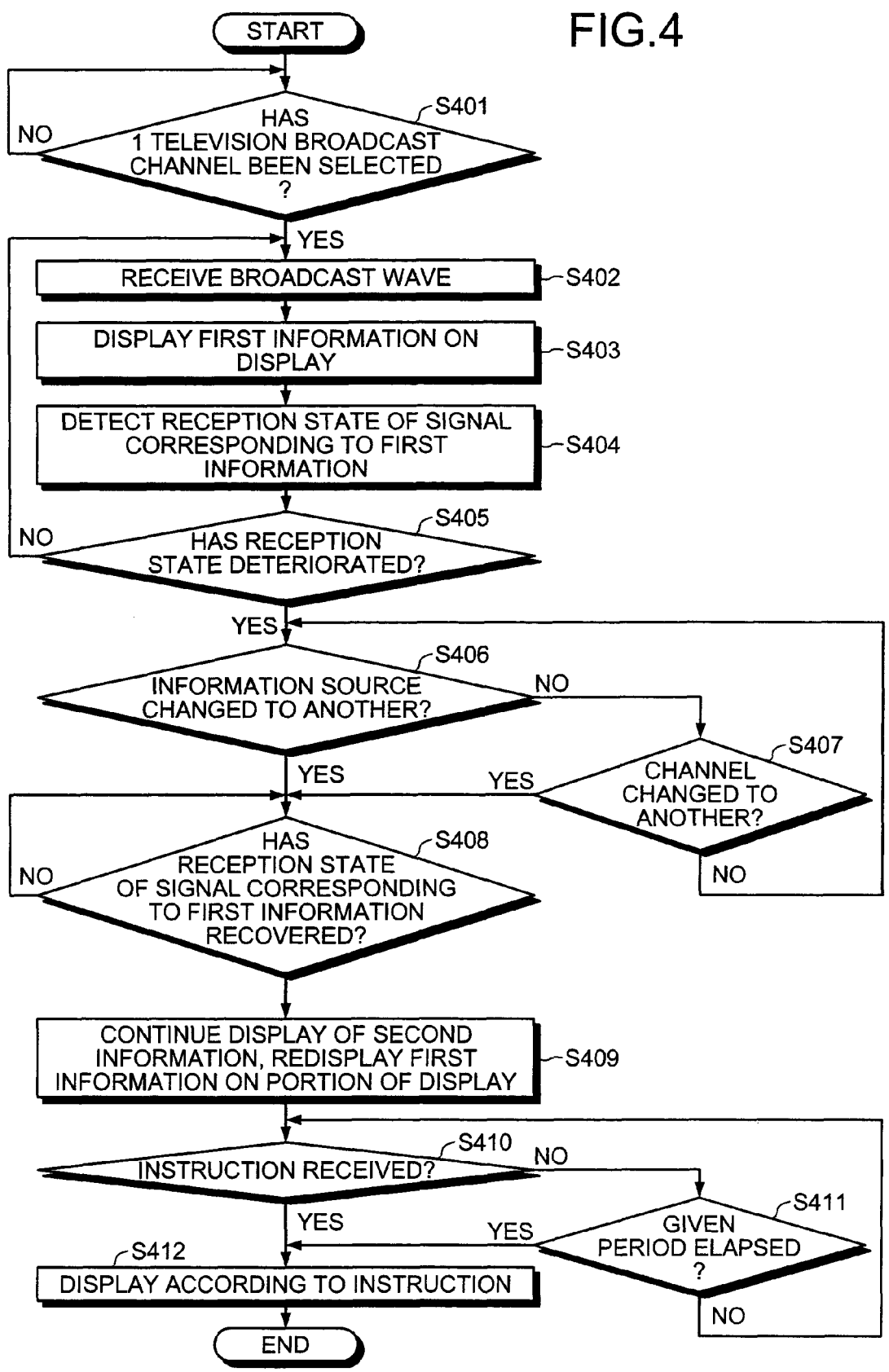
FIG. 4 is a flowchart of mobile-object broadcast receiving apparatus processing.

Processing by the mobile-object broadcast receiving apparatus 300 will be described. FIG. 4 is a flowchart of mobile-object broadcast receiving apparatus processing. As depicted in the flowchart of FIG. 4, the mobile-object broadcast receiving apparatus 300 waits until one channel of a broadcast wave is selected (step S401: NO), when one channel of the broadcast wave has been selected (step S401: YES), the broadcast wave is received via the communication I/F 313 (step S402).

The mobile-object broadcast receiving apparatus 300 displays on the display 312, information (first information) that is based on a signal corresponding to the channel selected at step S401 and included in the broadcast wave received at step S402 (step S403). The mobile-object broadcast receiving apparatus 300 detects the reception state of the signal corresponding to the first information displayed on the display 312 at step S403 (step S404).

The mobile-object broadcast receiving apparatus 300 judges whether the reception state detected at step S404 has deteriorated (step S405). At step S405, if the reception state is judged to be favorable (step S405: NO), the mobile-object broadcast receiving apparatus 300 returns to step S402 and repeats the processing therefrom.

At step S405, if the reception state is judged to have deteriorated (step S405: YES), the mobile-object broadcast receiving apparatus 300 judges whether the information displayed on the display 312 has been changed to another information source (step S406). At step S406, if the information has been judged to not have been changed (step S406: NO), the mobile-object broadcast receiving apparatus 300 judges whether the information displayed on the display 312 has been changed a channel other than the channel selected at step S401 (step S407). As step S407, if the channel has not been changed (step S407: NO), the mobile-object broadcast receiving apparatus 300 returns to step S406 and repeats the processing therefrom.

Here, information related to another information source changed to at step S406 or information based on the signal corresponding to the channel changed to at step S407 is regarded as second information. The first information may be changed to the second information by the acceptance of an instruction from the user or may be changed automatically based on a preliminarily set instruction.

At step S406, if the information source is judged to have been changed (step S406: YES) or at step S407, if the channel is judged to have been changed (step S407: YES), the mobile-object broadcast receiving apparatus 300 waits for the reception state of the signal corresponding to the first information before the change to recover (step S408: NO). At step S408, if the reception state of the signal corresponding to the first information is judged to have recovered (step S408: YES), the mobile-object broadcast receiving apparatus 300 continues the display of the second information and redisplays the first information on a portion of the display 312 (step S409). The display position and the display method will be described hereinafter.

At step S409, when both the first information and the second information are displayed on the display 312, the mobile-object broadcast receiving apparatus 300 judges whether an instruction selecting either information to be displayed alone on the display 312, has been accepted from the user (step S410). At step S410, if an instruction has not been accepted (step S410: NO), the mobile-object broadcast receiving apparatus 300 times whether a given period has elapsed since the display of both the first information and the second information on the display 312 at step S409 (step S411). At step S411, if the given period has not elapsed (step S411: NO), the mobile-object broadcast receiving apparatus 300 returns to step S410 and repeats the processing therefrom.

At step S410, if an instruction has been received from the user (step S410: YES), or at step S411, if the given period has elapsed (step S411: YES), the mobile-object broadcast receiving apparatus 300 displays the information on the display 312, based on the instruction accepted at step S410 or the preliminarily set instruction (step S412), ending the processing.

In the flowchart depicted in FIG. 4, at step S412, the first information or the second information alone may be displayed, or both the first information and the second information may be displayed. The display position and the display method are described hereinafter.

(Example of Information Display Method Used in Mobile-Object Broadcast Receiving Apparatus)

Figure 5:
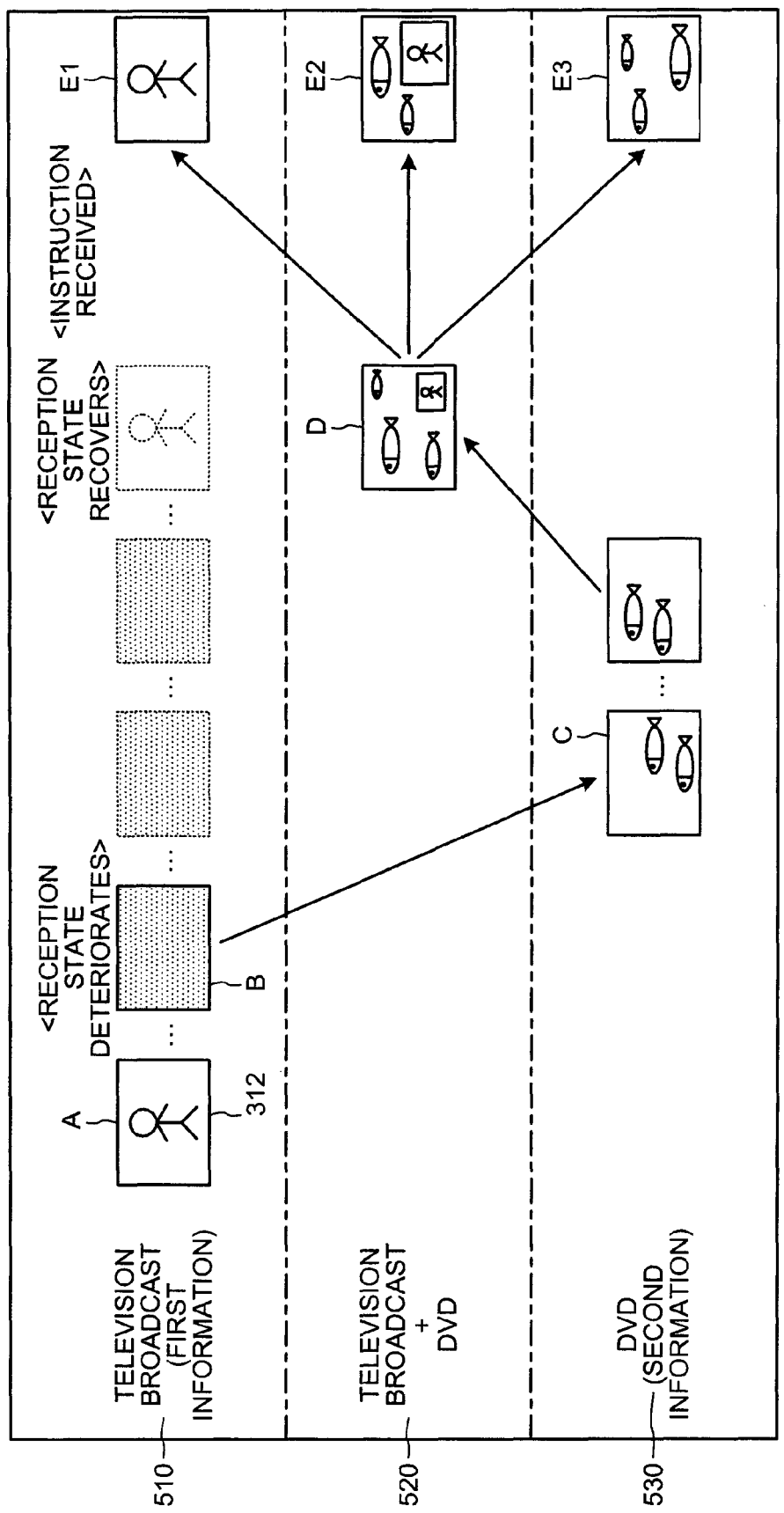
FIG. 5 is a diagram depicting an example of an information display method used in the mobile-object broadcast receiving apparatus.

An example of an information display method used in the mobile-object broadcast receiving apparatus 300 will be described. FIG. 5 is a diagram depicting an example of an information display method used in the mobile-object broadcast receiving apparatus. In the example depicted in FIG. 5, the first information and the second information are of different information sources. Specifically, the information source of first information 510 is a television broadcast and the information source of second information 530 is a DVD. As depicted in FIG. 5, at step S403 depicted in FIG. 4, when the first information 510 is displayed on the display 312, the video of the signal of the first information 510 is displayed on the display 312 (screen A).

When the reception of the signal corresponding to the first information 510 deteriorates, the video signal of the first information 510 is lost and the first information 510 ceases to be displayed on the display 312 (screen B). Here, at step S405 depicted in FIG. 4, the reception state is judged to have deteriorated.

According to a user operation or an instruction preliminarily set in the mobile-object broadcast receiving apparatus 300, the second information 530 is displayed on the display 312 (screen C). Here, at step S406 depicted in FIG. 4, the information source is judged to have been changed to another information source. While the reception state of the signal corresponding to the first information 510 is monitored, the second information 530 continues to be displayed on the display 312.

Subsequently, if the reception state of the signal corresponding to the first information 510 has recovered, at step S409 depicted in FIG. 4, the display of the second information 530 is continued and the first information 510 is redisplayed on a portion of the display 312 (screen D). In other words, different information sources (the television broadcast and the DVD) are both displayed (first information+second information 520).

At step S412 depicted in FIG. 4, any one among screens E1 to E3 is depicted on the display 312, based on an instruction accepted from the user at step S410: YES depicted in FIG. 4 or a preliminarily set instruction after a given period elapses from the screen change to screen D at step S411: YES.

(Example of Redisplay Area and Visual Effect for First Information in Mobile-Object Broadcast Receiving Apparatus)

Figure 6:
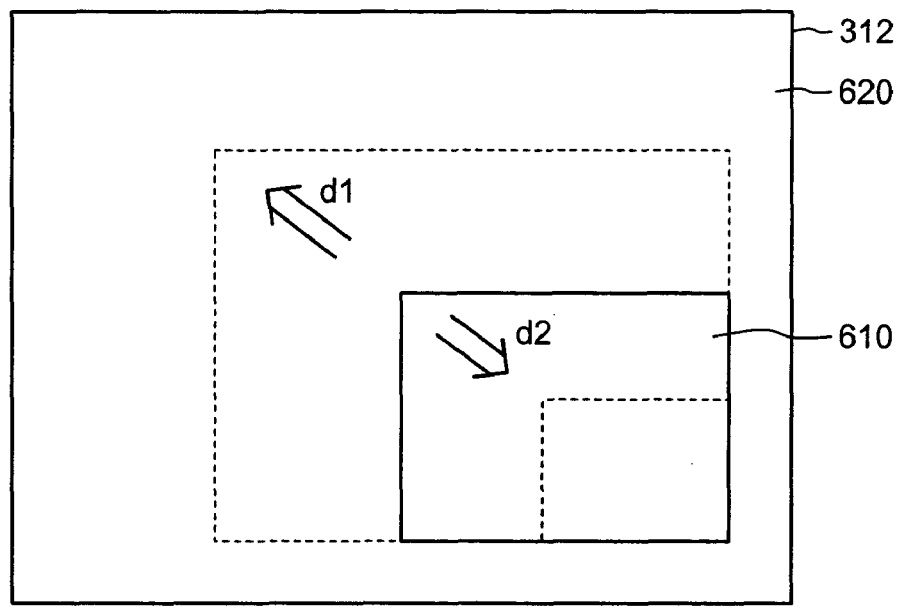
FIG. 6 is a diagram depicting an example of a redisplay area and visual effect for first information in the mobile-object broadcast receiving apparatus.

An example of a redisplay area and visual effect for the first information in the mobile-object broadcast receiving apparatus 300 will be described. FIG. 6 is a diagram depicting an example of a redisplay area and visual effect for the first information in the mobile-object broadcast receiving apparatus. With reference to FIG. 6, an example is described where a first-information redisplay area 610 is smaller than a second-information display area 620.

As depicted in FIG. 6, at step S409 depicted in FIG. 4 when the display of the second information is continued and the first information is redisplayed on a portion of the display 312 (screen D in FIG. 5), for example, the first-information redisplay area 610 is displayed at a lower right area of the display 312 overlapping the second-information display area 620. The first-information redisplay area 610 is not limited to a lower right area. Specifically, the first-information redisplay area 610 may be at the top, the bottom, the center, the left or the right of the display 312, or an intermediate position thereof (e.g., lower left). In other words, the position of the first-information redisplay area 610 is not limited provided the display of the second information is not hindered.

A visual effect for the display area depicted in FIG. 6, for example, is a gradual enlargement of the first-information redisplay area 610 as indicated by arrow d1. In this case, the second-information display area 620 may be gradually reduced and after a given period, the first information alone is displayed.

Another visual effect for the display area depicted in FIG. 6, for example, is a gradual reduction of the first-information redisplay area 610 as indicated by arrow d2. In this case, after the first-information redisplay area 610 is gradually reduced as indicated by arrow d2, the first-information redisplay area 610 may be returned its original size, and again gradually reduced as indicated by arrow d2. Further, the processing of gradually reducing and returning the first-information redisplay area 610 to its original size may be repeated several times, whereby the user can be prevented from overlooking the display of the first information.

(Another Example of Redisplay Area and Visual Effect for First Information in Mobile-Object Broadcast Receiving Apparatus)

Figure 7:
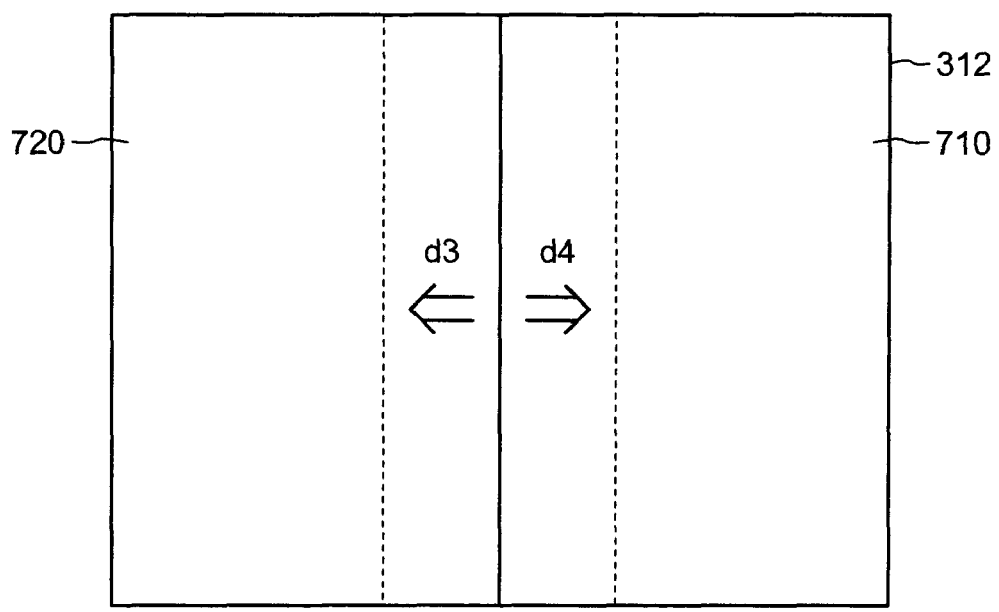
FIG. 7 is a diagram depicting an example of a redisplay area and visual effect for the first information in the mobile-object broadcast receiving apparatus.

Another example of a redisplay area and visual effect for the first information in the mobile-object broadcast receiving apparatus 300 will be described. FIG. 7 is a diagram depicting an example of a redisplay area and visual effect for the first information in the mobile-object broadcast receiving apparatus. With reference to FIG. 7, another example is described where a first-information redisplay area 710 is equivalent in size to a second-information display area 720.

As depicted in FIG. 7, at step S409 depicted in FIG. 4 when the display of the second information is continued and the first information is redisplayed on a portion of the display 312 (screen D in FIG. 5), for example, the first-information redisplay area 710 is displayed at a right-hand side of the display 312, without overlapping a second-information display area 720 or overlapping without interfering with the display of the second information. The first-information redisplay area 710 is not limited to the right-hand side. Specifically, the first-information redisplay area 710 may be at the top, the bottom, the left or the right of the display 312, or an intermediate position thereof (e.g., the second information at the upper left, the first information at the lower right). In other words, the position of the first-information redisplay area 710 is not limited provided the display of the second information is not hindered.

A visual effect for the display area depicted in FIG. 7, for example, is a sliding of the first-information redisplay area 710 as indicated by arrow d3. In this case, the first-information redisplay area 710 may be gradually widened on the display 312 and after a given period, the first information alone may be displayed.

Another visual effect for the display area depicted in FIG. 7, for example, is a sliding of the first-information redisplay area 710 as indicated by arrow d4. In this case, the first-information redisplay area 710 may be narrowed on the display 312 and after a given period, the second information alone may be displayed.

As described, according to the mobile-object broadcast receiving apparatus 300 of the example, after the reception state of a channel of a selected television broadcast has deteriorated and another source such as a DVD or another channel of the television broadcast has been changed to, the reception state of the channel can be monitored. If the reception state of the channel recovers, both information that is being displayed and the broadcast content of the channel can be displayed on a portion of the display. Consequently, the user is able to compare the information that is currently being displayed while checking the broadcast contents of the channel that was originally being viewed. Therefore, if the user wants to continue viewing the information that is currently being displayed, the information is not automatically changed to the channel that was originally being viewed.

Further, according to the mobile-object broadcast receiving apparatus 300 of the example, when information that is currently being displayed and information that was originally being viewed are both displayed, by an acceptance of an instruction from the user, selecting either information alone to be displayed, only the information desired by the user can be displayed. Consequently, the user can determine which information to display while checking the contents of the information. Thus, when the reception state of the channel that was originally being viewed recovers, the trouble of reselecting the channel and checking the broadcast contents is eliminated, enabling easy determination of the information to be displayed on the display.

According to the mobile-object broadcast receiving apparatus 300 of the example, even if an instruction from the user is not received within a given period, the desired information alone can be displayed based on a preliminarily set instruction. Consequently, if the user, for example, preliminarily sets an instruction to display either information, the user need only perform an operation when the user wishes to display different information, facilitating simpler operation for setting information to be displayed on the display.

According to the mobile-object broadcast receiving apparatus 300 of the example, while the acceptance of an instruction from the user is awaited, the first information can be displayed by various types of visual effects, whereby even when 2 broadcast programs are displayed on the display, the user is able to easily determine which is the first information for which the reception state has recovered.

As described, according to the information display apparatus, the information display method, the information display program, and the recording medium of the present invention, under circumstances when the reception state of a broadcast wave, for example at a mobile object, has the potential of deteriorating, if the reception state does deteriorate and consequently the channel is changed, the broadcast contents when the reception state recovers can be displayed on a portion of the display unit while the display of the other information continues.

The information display method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the recording medium, and executed by the computer. The program may be a transmission medium that can be distributed through a network such as the Internet.

The invention claimed is:

1. An information display apparatus having a display unit that displays first information that is based on a signal corresponding to one channel in a broadcast wave received by a receiving unit, the information display apparatus comprising:
 a detecting unit that detects a reception state of the signal corresponding to the first information while the first information is displayed on the display unit;
 a judging unit that judges whether information displayed on the display unit has been changed from the first information to second information, if the reception state of the signal corresponding to the first information has deteriorated;
 a monitoring unit that monitors whether the reception state of the signal corresponding to the first information has returned to a favorable state, if the information displayed on the display unit has been judged to have been changed to the second information; and
 a display control unit that continues display of the second information and redisplays the first information on a portion of the display unit, if the reception state of the signal of the first information has returned to the favorable state.

2. The information display apparatus according to claim 1, further comprising
 an accepting unit that accepts from a user, an instruction selecting either information to be displayed alone on the display unit, when both the first information and the second information are displayed on the display unit, wherein
 the display control unit displays on the display unit, only one among the first information and the second information, based on a selection instruction accepted by the accepting unit.

3. The information display apparatus according to claim 1, further comprising:
 a timing unit that times whether a given period has elapsed since a redisplay of the first information on a portion of the display unit by the display control unit, wherein
 the display control unit displays only one among the first information and the second information on the display unit, based on a preliminarily set instruction, if the given period has elapsed according to timing by the timing unit.

4. The information display apparatus according to claim 1, wherein
 the display control unit redisplays on a portion of the display unit, the first information in a size equivalent to or smaller than the size of the second information.

5. The information display apparatus according to claim 1, wherein the display control unit redisplays the first information in a size that changes stepwise.

6. The information display apparatus according to claim 1, wherein the judging unit judges whether the information displayed on the display unit has been changed from the first information to the second information, if electric field strength of the signal corresponding to the first information is equal to or less than a given value.

7. The information display apparatus according to claim 1, wherein the judging unit judges whether the information displayed on the display unit has been changed from the first information to the second information, if an error rate of the signal corresponding to the first information is equal to or greater than a given value.

8. An information display method of an information display apparatus having a display unit that displays first information that is based on a signal corresponding to one channel in a broadcast wave received by a receiving unit, the information display method comprising:
 detecting a reception state of the signal corresponding to the first information while the first information is displayed on the display unit; judging whether information displayed on the display unit has been changed from the first information to second information, if the reception state of the signal corresponding to the first information has deteriorated;
 monitoring whether the reception state of the signal corresponding to the first information has returned to a favorable state, if the information displayed on the display unit has been judged to have been changed to the second information; and
 controlling to continue display of the second information and redisplay the first information on a portion of the display unit, if the reception state of the signal of the first information has returned to the favorable state.

9. A non-transitory computer-readable recording medium storing therein an information display program that in relation to an information display apparatus having a display unit that displays first information that is based on a signal corresponding to one channel in a broadcast wave received by a receiving unit, causes a computer to execute:

detecting a reception state of the signal corresponding to the first information while the first information is displayed on the display unit;

judging whether information displayed on the display unit has been changed from the first information to second information, if the reception state of the signal corresponding to the first information has deteriorated;

monitoring whether the reception state of the signal corresponding to the first information has returned to a favorable state, if the information displayed on the display unit has been judged to have been changed to the second information; and controlling to continue display of the second information and redisplay the first information on a portion of the display unit, if the reception state of the signal of the first information has returned to the favorable state.

\* \* \* \* \*

UNITED STATES PATENT AND TRADEMARK OFFICE
CERTIFICATE OF CORRECTION

PATENT NO.        : 8,405,778 B2  
APPLICATION NO. : 13/120925  
DATED             : March 26, 2013  
INVENTOR(S)       : Yoshino et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 61 days.

Signed and Sealed this
First Day of September, 2015

Michelle K. Lee
*Director of the United States Patent and Trademark Office*